(12) United States Patent
Liu

(10) Patent No.: US 7,342,607 B2
(45) Date of Patent: Mar. 11, 2008

(54) MATHEMATICAL CALCULATION METHOD FOR AN IMAGE CAPTURING DEVICE

(75) Inventor: Wen-Jun Liu, Kao Hsiung (TW)

(73) Assignee: Service & Quality Technology Co., Ltd., Taipei (TW)

( * ) Notice: Subject to any disclaimer, the term of this patent is extended or adjusted under 35 U.S.C. 154(b) by 647 days.

(21) Appl. No.: 11/004,982

(22) Filed: Dec. 7, 2004

(65) Prior Publication Data

US 2006/0119909 A1 Jun. 8, 2006

(51) Int. Cl.
- *H04N 5/228* (2006.01)
- *H04N 9/09* (2006.01)
- *H04N 9/083* (2006.01)
- *H04N 3/14* (2006.01)
- *G06K 9/00* (2006.01)

(52) U.S. Cl. ............... 348/273; 348/280; 348/222.1; 382/167

(58) Field of Classification Search ........... 348/210.99, 348/222.1, 223.1, 234, 263, 265, 266, 268, 348/272, 294, 336, 225.1, 267, 269, 270, 348/273, 280; 396/275; 382/162, 167
See application file for complete search history.

(56) References Cited

U.S. PATENT DOCUMENTS 6,642,956 B1 * 11/2003 Safai ..................... 348/222.1
6,947,078 B1 * 9/2005 Kuwata et al. .......... 348/223.1
7,068,285 B2 * 6/2006 Lee ......................... 345/605
7,116,819 B2 * 10/2006 Zhang ..................... 382/162

* cited by examiner

*Primary Examiner*—Ngoc-Yen Vu
*Assistant Examiner*—Peter Chon
(74) *Attorney, Agent, or Firm*—Rosenberg, Klein & Lee

(57) ABSTRACT

A mathematical calculation method for an image-capturing device includes steps: estimating a green value of a red, blue pixel; calculating four differences between an estimated red value and four neighboring green pixels, weighing proportions of the four neighboring green pixels, and summing up the differences between the four products induced by multiplying the four differences and the four proportions respectively, as a green value G3' in the red pixel. A green value of a blue pixel will be obtained by mentioned steps. A blue value of the red pixel occurs when the following steps: figuring out differences between four green values and four blue values of four neighboring blue pixels, averaging the four differences, and subtracting the average of the four differences from the green value of the red pixel. A red value of the blue pixel and a red, blue value of the green pixel can be estimated, too.

18 Claims, 4 Drawing Sheets

MATHEMATICAL CALCULATION METHOD FOR AN IMAGE CAPTURING DEVICE

BACKGROUND OF THE INVENTION

1. Field of the Invention

The present invention relates to a mathematical calculation method for an image-capturing device, and particularly relates to a mathematical calculation method for an image-capturing device, adapted for modeling digital images.

2. Background of the Invention

In the digital age, relevant hardware and software technology is growing and developing at a rapid rate and digital image-capturing devices are used more and more regularly in people's everyday lives, such as for digital cameras, digital video or digital products of the like.

Besides the image capturing sensors, such as a charge coupled device (CCD) or a complementary metal-oxide semiconductor (CMOS), the image quality of the digital image-capturing devices depends on the image processing chips.

The image-capturing sensor captures image signals of pixels via matrix photocells. Each photocell does not catch the three primary colors (R, G, B), but catches a single, specific color in each pixel. For example, a red filter arranged in a photocell captures a red image signal, so that each photocell has only a single image signal. The most commonly used pattern of an individual photocell on the image-capturing sensor has a red-green-red-green (RGRG) sequence in the first row and green-blue-green-blue (GBGB) sequence in the second row, for a vertical-and-horizontal alternately arrangement, illustrated in FIG. 1.

In the alternate arrangement of the three color photocells, the green color photocells are mainly processed and arranged separately by blue and red color photocells, and the image process chip calculates a digital color image for stimulating the other two colors in each pixel. For example, for resetting a green value G3' and a blue value B3' in a red pixel R3, the upside, the downside, the left side and the right side are arranged with green pixels (G6, G7, G8, G9); and the upper-left side, the lower-left side, the upper-right side and the lower-right side are arranged with blue pixels (B18, B19, B20, B21). Therefore, an average green value, which is obtained by estimating from the adjacent green pixels (G6, G7, G8, G9) surrounding the red pixel, and an average blue value, which is obtained by estimating from the adjacent blue pixels (B18, B19, B20, B21) surrounding the red pixel, are the green value G3' and the blue value B3' matching the red pixel.

According to the conventional method of calculating a digital image, the quantity of photocells can be reduced, the volume of the image-capturing devices can be shrunk, so that costs can be lowered. However, due to the estimating of color values, weird points may occur on the edge of the image contour, particularly when a large color contrast occurs, the sharp teeth edge of the image contour or the vague image may come about. This kind of shortcoming cannot be overcome if the conventional method of the mathematical calculation is used. Thus, a new method of mathematical calculation will be provided to overcome the shortcomings mentioned above and further increase the processing speed of an image-processing chip.

SUMMARY OF THE INVENTION

The primary objectives of the invention are therefore to specify a mathematical calculation method for an image-capturing device, in order to estimate the two missing color values for a one-color pixel easily, rapidly and, accurately, and to reduce the wrong color values for avoiding vague images, and to provide a mathematical calculation method that can be applied with simple operation.

According to the invention, the objectives are achieved by providing a mathematical calculation method for an image-capturing device, adapted for an image-capturing sensor capturing an image signal, wherein the image-capturing sensor includes a plurality of photocells for obtaining three primary colors (red, blue, green). Each photocell catches one color and estimates the other two color values as a pixel. The mathematical calculation method includes the following steps:

defining two green pixels adjacent to a red pixel R3 above or beneath vertically as G6 and G9, and two green pixels adjacent to the red pixel R3 on the left side or right side horizontally as G7 and G8, respectively;

defining two red pixels spaced one pixel's distance from the red pixel R3 above or beneath vertically as R1 and R5, and two red pixels spaced one pixel's distance from the red pixel R3 on the left side or right side horizontally as R2 and R4, respectively;

obtaining four differences (k1~k4) by subtracting an average value of the two relative red pixels, which are adjacent to a respective one of the mentioned four green pixels (G6~G9), from the respective green pixel;

calculating four weighting values (k5~k6) from the four differences (k1~k4);

summarizing the value of the red pixel R3 and the four products, which is induced by multiplying the four differences (k1~k4) and the four weighting values (k5~k6) respectively, as a green value G3' in the red pixel;

defining four blue pixels adjacent to the upper-left side the, lower-left side, the upper-right side and the lower-right side of the red pixel R3 as B18, B19, B20 and B21, respectively;

repeating the mentioned steps, in order to get four green values in the other four red pixels and four green values (G18'~G21') in the four blue pixels (B18~B21), respectively;

obtaining four differences (k11~k14) by subtracting four blue pixels (B18~B21) from the four green values (G18'~G21');

obtaining a blue value B3' in the red pixel R3 by subtracting an average value of the four differences (k11~k14) from the green value G3';

repeating the mentioned steps, in order to get four blue values (B1', B2', B4' and B5') in the other four red pixels, respectively;

repeating the mentioned steps, in order to get four red values (R18', R19', R20' and R21') in the four blue pixels, respectively; and obtaining four red values (R6'~R9') and four blue value (B6'~B9') in a respective one (G6) of the four green pixels (G6~G9) by calculating the red difference (G1'−R1, G3'−R3) and the blue difference (G18'−B18, G19'−B19).

Particularly, according to the present invention, the equations corresponding to the four differences (k1~k4) include:

$$k1 = G6 - ((R1+R3)/2);$$

$$k3 = G9 - ((R5+R3)/2);$$

$$k2 = G7 - ((R2+R3)/2); \text{ and}$$

$$k4 = G8 - ((R4+R3)/2).$$

Particularly, according to the present invention, the equations corresponding to the four weighting values (k5~k6) include:

$k5=1/(1+|k1|);$ $k6=1/(1+|k2|);$ $k7=1/(1+|k3|);$ and $k8=1/(1+|k4|).$

Particularly, according to the present invention, to figure out the proportions of the four weighting values (k5~k6) to a total weighting value (k9) individually, and equations corresponding to the four weighting values (k5~k6) including:

$k5=k5/k9;$ $k6=k6/k9;$ $k7=k7/k9;$ and $k8=k8/k9.$

Particularly, according to the present invention, the equation corresponding to the green value G3' of the red pixel includes:

$G3'=R3+(k5*k1)+(k6*k2)+(k7*k3)+(k8*k4).$

Particularly, according to the present invention, the equations corresponding to the four differences (k11~k14), and the green value G3' of the red pixel include:

$k11=G18'-B18;$ $k12=G19'-B19;$ $k13=G20'-B20;$ $k14=G21'-B21,$ and $B3'=G3'-((k11+k12+k13+k14)/2^2).$ To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
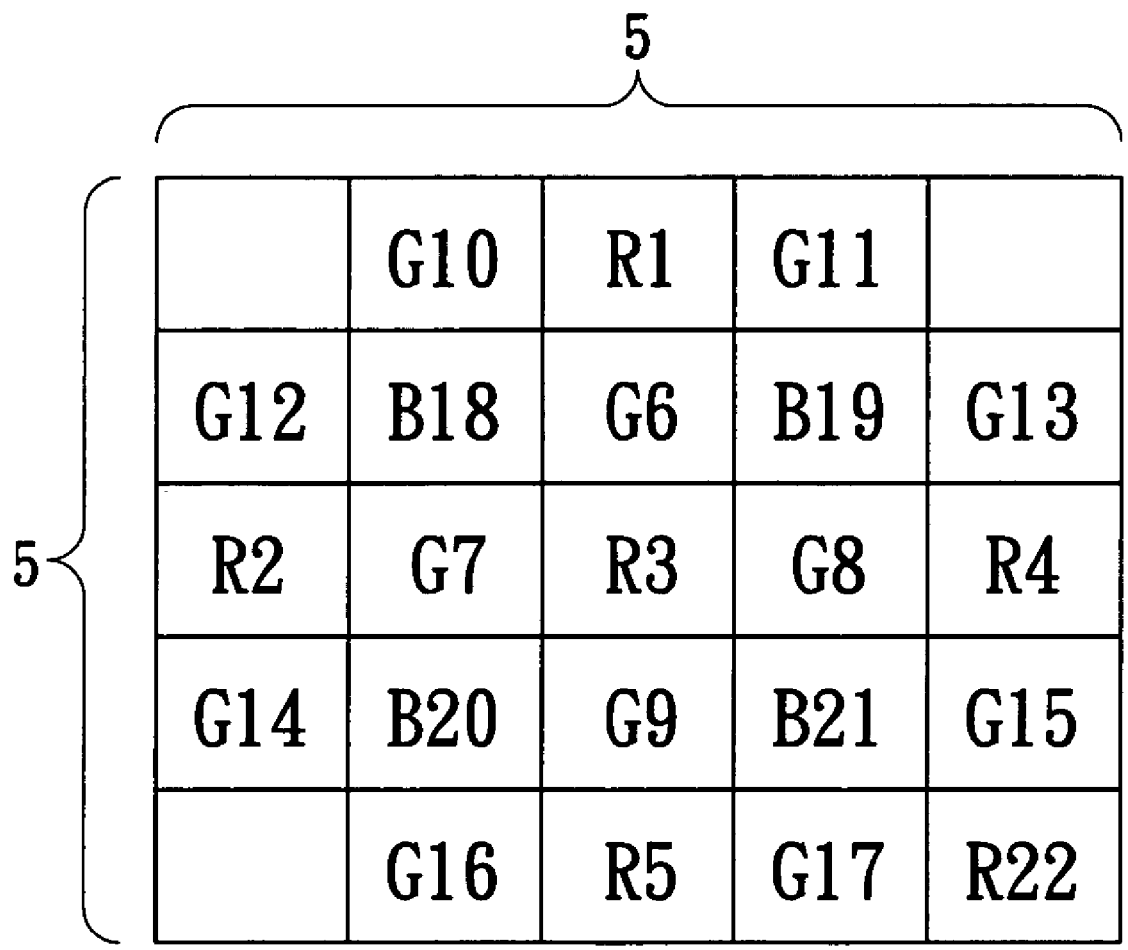
FIG. 1 is a perspective view of an image array according to an image-capturing device of the present invention.

With respect to FIG. 1, a mathematical calculation method of an image-capturing device, adapted for an image-capturing sensor capturing an image signal, wherein the image-capturing sensor includes a plurality of photocells for obtaining three primary colors (red, blue, green), each photocell catches one color and further estimates the other two color values as three colors of each pixel, and the mathematical calculation method is used to estimate the missing color values of each pixel.

Figure 2:
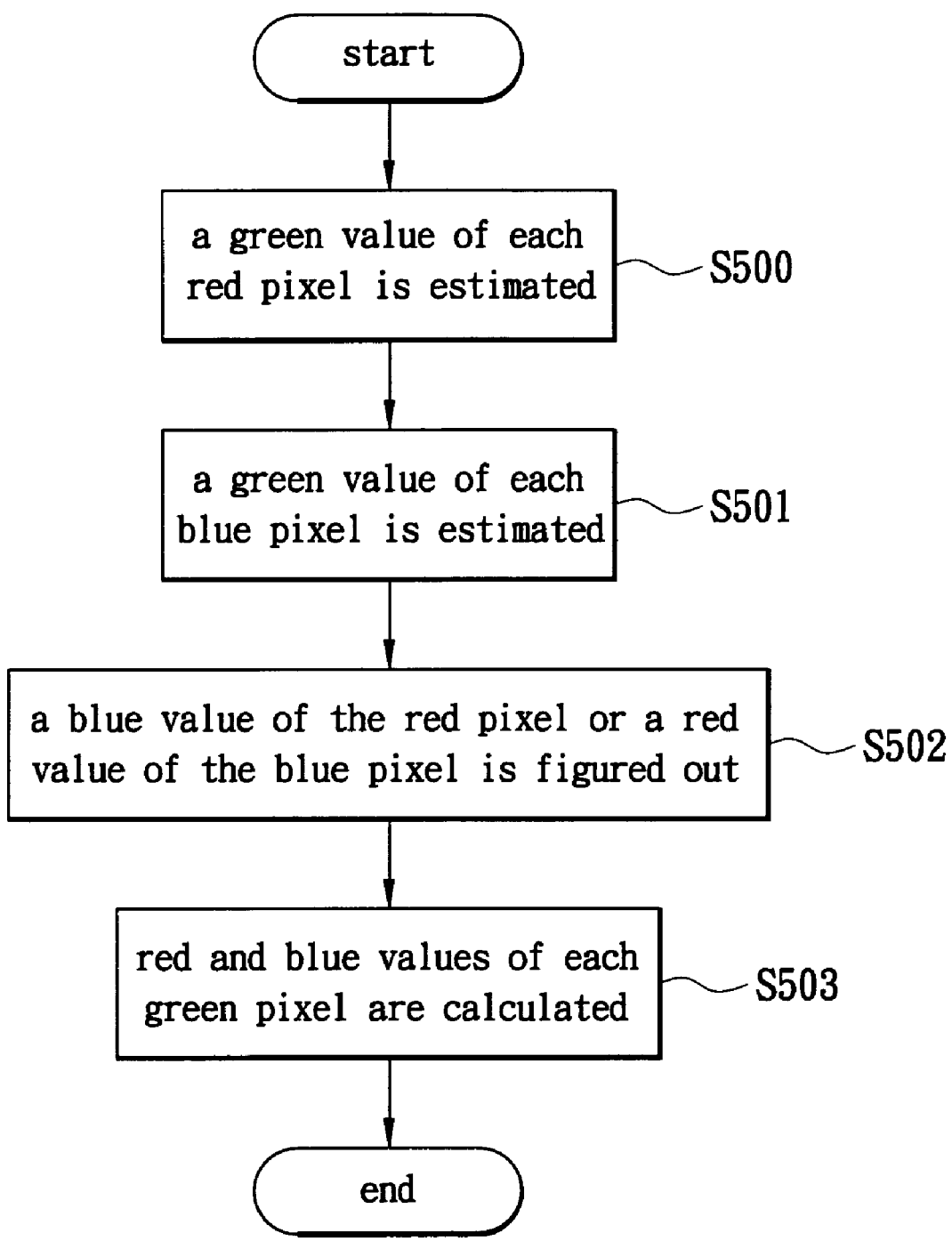
FIG. 2 is a flow chart according to the present invention.

The flow chart of a 5-5 array of the photocells is described in FIG. 2; first, a green value of each red pixel is estimated (S500), and the green value of the red pixel is calculated by weighing the neighboring green values. Second, a green value of each blue pixel is estimated (S501) by weighing the neighbor green pixels. Third, a blue value of the red pixel or a red value of the blue pixel is figured out (S502) by weighting a quarter of the neighboring (upper-left, upper-right, lower-left and lower-right) blue (red) pixels around the red (blue) pixels. Fourth, red and blue values of each green pixel are calculated (S503) by weighting half of the estimated green and blue (red) values.

Figure 3:
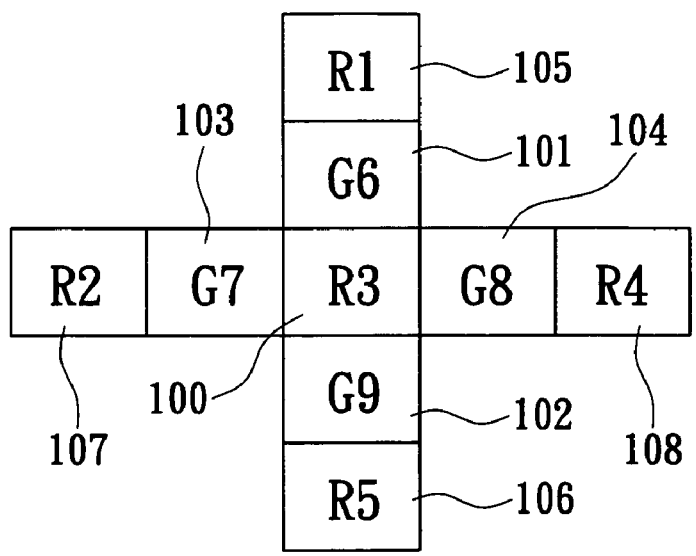
FIG. 3 is a perspective view of a mode for estimating a green value of a red pixel according to the present invention.

A mode for estimating the green value G3' of any red pixel R3 according to the present invention is illustrated in FIG. 3. Firstly defining two green pixels (101, 102) adjacent to the red pixel R3 (100) above or beneath vertically as G6 and G9, and two green pixels (103, 104) adjacent to the red pixel R3 left side or right side horizontally as G7 and G8, respectively. Next two red pixels (105, 106) are defined and spaced one-pixel's distance from the red pixel R3 (100) above or beneath vertically as R1 and R5, and two red pixels (107, 108) spaced one-pixel's distance from the red pixel R3 (100) on the left side or the right side horizontally as R2 and R4, respectively.

Four differences k1~k4 are then obtained by subtracting an average value of the two relative red pixels, which are adjacent to a respective one of the mentioned four green pixels G6~G9 (101~104), from the respective green pixel; and the equations corresponding to the four differences k1~k4 include:

$k1=G6-((R1+R3)/2);$ $k3=G9-((R5+R3)/2);$ $k2=G7-((R2+R3)/2);$ and $k4=G8-((R4+R3)/2).$ Next, to calculate four weighing values k5~k6 from the four differences k1~k4; and the equations corresponding to the four weighing values k5~k6 include:

$k5=1/(1+|k1|);$ $k6=1/(1+|k2|);$ $k7=1/(1+|k3|);$ $k8=1/(1+|k4|);$ and $k9=k5+k6+k7+k8.$ Then, to calculate the weighing values (k5, k6, k7 and k8) proportion to the total weighing value k9 in order to replace the weighing values (k5, k6, k7 and k8), and the equations corresponding to the four weighing values k5~k6 includes:

$k5=k5/k9;$ $k6=k6/k9;$ $k7=k7/k9;$ and $k8=k8/k9.$

Finally, surmising the value of the red pixel R3 100 and the four products, which are induced by multiplying the four differences k1~k4 and the four weighing values k5~k6 respectively, as the green value G3' in the red pixel, and the equations corresponding to the green value G3' include:

$G3'=R3+(k5*k1)+(k6*k2)+(k7*k3)+(k8*k4).$

Similar to the previously mentioned steps, the green values G1', G2', G4' and G5' of the other red pixels R1, R2, R4 and R5 (105, 107, 106, and 108) and the green values G18', G19', G20' and G21' of the blue pixels B18, B19, B20 and B21 (201, 202, 203, and 204) are reset.

Figure 4:
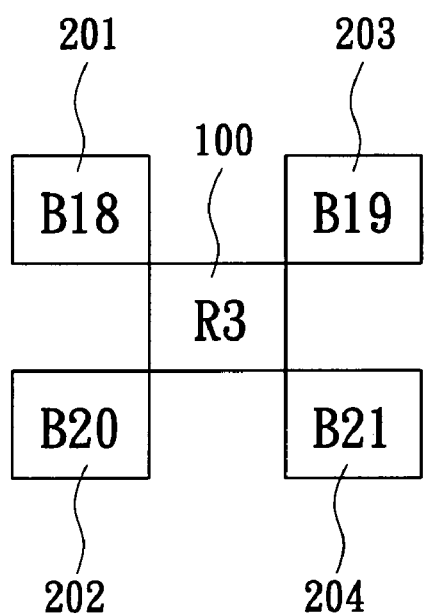
FIG. 4 is a perspective view of a mode for estimating a blue value of the red pixel according to the present invention.

After the green value G3' of the red pixel R3 (100) is done, the blue value B3' of the red pixel R3 (100) is processed in FIG. 4. Defining four blue pixels (201, 203, 202, 204) adjacent to the upper-left side the, the upper-right side, the lower-left side and the lower-right side of the red pixel R3 (100) as B18, B20, B19 and B21, respectively, obtains four green values G18'~G21' in the four blue pixels (B18~B21), respectively.

Next, obtaining four differences k11~k14 by subtracting four blue pixels B18~B21 from the four green values G18'~G21'; and the equations corresponding to the four differences k11~k14 include:

$k11=G18'-B18;$ $k12=G19'-B19;$ $k13=G20'-B20;$ and $k14=G21'-B21.$

Finally, the blue value B3' in the red pixel R3 is obtained by subtracting an average value of the four differences k11~k14 from the green value G3'; the equations corresponding to the blue value B3' include:

$B3'=G3'-((k11+k12+k13+k14)/2^2).$

Similar to the above-mentioned steps, the four blue values B1', B2', B4' and B5' (105, 107, 106 and 108) in the other four red pixels R1, R2, R3 and R4, and the red value R18', R19', R20' and R21' of the blue pixels B18, B19, B20 and B21 (201, 202, 203 and 204) are obtained.

Therefore, the four red values R6'~R9' and four blue values B6'~B9' in the four green pixels G6~G9 (101~104) are obtained by calculating the red difference (G1'-R1, G3'-R3) and the blue difference (G18'-B18, G19'-B19), and the equations corresponding to the red value R6' and the blue value B6' of the four green pixels G6~G9 (101~104) include:

$k15=G1'-R1;$ $k16=G3'-R3;$ $k17=G18'-B18;$ $k18=G19'-B19;$ $R6'=G6-((k15+k16)/2);$ and $B6'=G6-((k17+k18)/2).$ Thus, the missing color values in each photocell can be easily set. If the blue value B3' is more or less than the upper or lower limit value of the hardware in practice, the blue value B3' equals the upper or lower limit value. For example of a $2^8$ digital hardware, the upper limit value is 255 and the lower limit value 0, so that the blue value B3' of the red pixel R3 (100) is equal to 255 if the blue value B3' is more than 255, or the blue value B3' of the red pixel R3 (100) is equal to 0 if the blue value B3' is less than 0.

The blue value B6' and the red value R6' of the green pixel G6 (101) also possibly exceed the upper and the lower values, so that the blue value B6' of the green pixel G6 (101) is equal to 255 if the blue value B6' is more than 255, or the blue value B6' of the green pixel G6 (101) is equal to 0 if the blue value B6' is less than 0; and the red value R6' of the green pixel G6 (101) is equal to 255 if the red value R6' is more than 255, or the red value R6' of the green pixel G6 (101) is equal to 0 if the red value R6' is less than 0.

The calculation methods of the four differences k1~k4 and the four weighing values k5~k8 are the key points according to the present invention because the green pixel is an important color for the definition of colored images. Because the four weighing values k5~k8 are processed by the division operation, one approach is provided to get the four weighing values with simple hardware according to the present invention. Thus, the four absolute values of the four differences k1~k4 are sorted first, and a respective maximum value is obtained and a proportion of the maximum value to the sum of the four absolute values, and rearranging four weighing values k5~k8 corresponding to the proportion. The equations corresponding to the four weighing values k5~k8 include:

$k5=|k1|;$ $k6=|k2|;$ $k7=|k3|;$ $k8=|k4|;$ and ranking the four weighing values (k5~k8), so as to enable $k5 \leq k6 \leq k7 \leq k8$.

The regular corresponding to the ranking step include:

if k5>k6, then k99=k6, k6=k5, k5=k99, k99=k2, k2=k1, k1=k99;

if k6>k7, then k99=k7, k7=k6, k6=k99, k99=k3, k3=k2, k2=k99;

if k7>k8, then k99=k8, k8=k7, k7=k99, k99=k4, k4=k3, k3=k99;

if k5>k6, then k99=k6, k6=k5, k5=k99, k99=k2, k2=k1, k1=k99;

if k6>k7, then k99=k7, k7=k6, k6=k99, k99=k3, k3=k2, k2=k99;

if k5>k6, then k99=k6, k6=k5, k5=k99, k99=k2, k2=k1, k1=k99.

Figure 5:
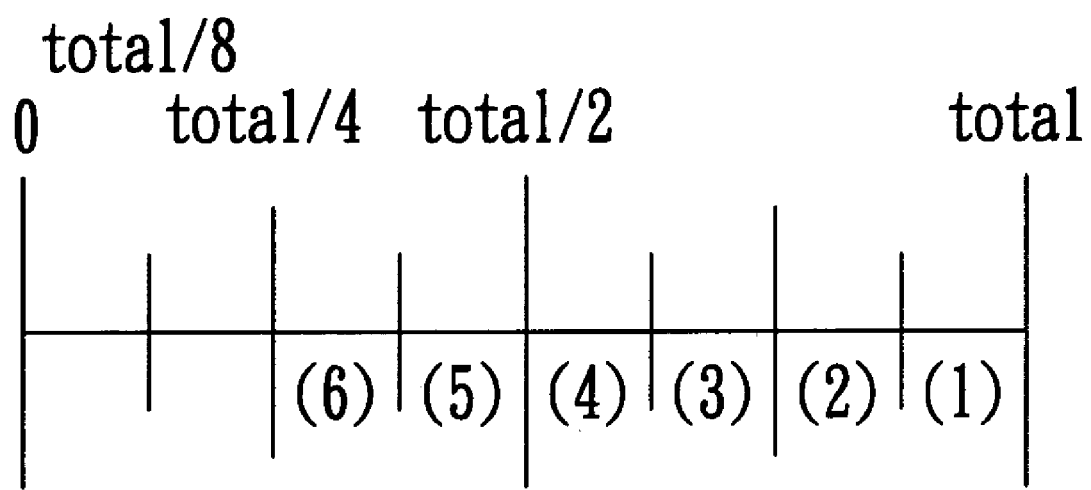
FIG. 5 is a perspective view for sorting part of the weighing values according to the present invention.

For the proportions of the new four weighing values in FIG. 5, the equations of the green value G3' are $k99=k5+k6+k7+k8;$ $k98=k99/2;$ $k97=k99/4;$ $k96=k99/8;$ k99, k98, k97 and k96 represent the summarization, the half, the quarter and one-eighth of k5~k8, respectively.

If k8>(k99−k96), which is located in an area (1) illustrated in FIG. 5, the proportion of k1 is ($2^5-2^2$), the proportion of k2 is 2, the proportions of k3 and k4 are 1, then $$k95=(k1*(2^5-2^2))+(k2*2)+k3+k4;$$

else if k8>(k99−k97), which is located in area (2), then $$k95=(k1*(2^5-2^3))+(k2*2^2)+(k3*2)+(k4*2);$$

else if k8>(k99−k97−k96), which is located in area (3), then $$k95=(k1*(2^5-2^3-22))+(k2*23)+(k3*2)+(k4*2);$$

else if k8>(k99−k98), which is located in area (4), then $$k95=(k1*2^4)+(k2*2^3)+(k3*2^2)+(k4*2^2);$$

else if k8>(k98−k96), which is located in area (5), then $$k95=(k1*(2^4-2^2))+(k2*(2^4-2^2))+(k3*2^2)+(k4*2^2);$$

or else (when the equations mentioned above are not exited), which is located in area (6) or another area, then $$k95=(k1*2^3)+(k2*2^3)+(k3*2^3)+(k4*2^3), \text{ thus}$$

G3', which is equal to R3+(k95/$2^5$), is accurately obtained.

In conventional digital processes, the division operation is highly complicated; so much so that costs cannot be decrease. A simple principle for shifting one bit to the right is equal to the division operation of dividing by 2. A simple multiplication circuit for shifting one bit to the left is equal to the division operation of multiplying by 2. Therefore, multiplying by 2 means one-bit shift to the left in digital processing, so that multiplying $2^2$ means a two-bit shift to the left, multiplying by $2^3$ means a three-bit shift to the left, multiplying by $2^4$ means a four-bit shift to the left, multiplying by $2^5$ means a five-bit shift to the left, and dividing by $2^5$ means a five-bit shift to the right. In accordance with these concepts, the operating speed according to the present invention can be increased and the image color will be become clearer.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A mathematical calculation method for an image-capturing device, adapted for an image-capturing sensor capturing an image signal, wherein the image-capturing sensor includes a plurality of photocells for obtaining three primary colors (red, blue, green), each photocell catches one color and further estimates the other two color values as three colors of each pixel, and the mathematical calculation method comprising of the following steps:

defining two green pixels adjacent to a red pixel R3 above or beneath vertically as G6 and G9, and two green pixels adjacent to the red pixel R3 to a left side or to a right side horizontally as G7 and G8, respectively;

defining two red pixels spaced one-pixel's distance from the red pixel R3 above or beneath vertically as R1 and R5, and two red pixels spaced one-pixel's distance from the red pixel R3's left side or right side horizontally as R2 and R4, respectively;

obtaining four differences (k1~k4) by subtracting an average value of the two relative red pixels, which is adjacent to a respective one of the mentioned four green pixels (G6~G9), from the respective green pixel;

calculating four weighing values (k5~k8) from the four differences (k1~k4);

summarizing the value of the red pixel R3 and the four products which is induced by multiplying the four differences (k1~k4) and the four weighing values (k5~k8) respectively, as a green value G3' in the red pixel;

defining four blue pixels adjacent to the upper-left side the, lower-left side, the upper-right side and the lower-right side of the red pixel R3 as B18, B19, B20 and B21, respectively;

repeating the mentioned steps, in order to get four green values in the other four red pixels and four green values (G18'~G21') in the four blue pixels (B18~B21), respectively;

obtaining four differences (k11~k14) by subtracting four blue pixels (B18~B21) from the four green values (G18'~G21');

obtaining a blue value B3' in the red pixel R3 by subtracting an average value of the four differences (k11~k14) from the green value G3';

repeating the mentioned steps, in order to get four blue values (B1', B2', B4' and B5') in the other four red pixels, respectively;

repeating the mentioned steps, in order to get four red values (R18', R19', R20' and R21') in the four blue pixels, respectively; and obtaining four red values (R6'~R9') and four blue values (B6'~B9') in a respective one (G6) of the four green pixels (G6~G9) by calculating the red difference (G1'−R1, G3'~R3) and the blue difference (G18'−B18, G19'−B19).

2. The mathematical calculation method as claimed in claim 1, wherein equations corresponding to the four differences (k1~k4) include:

$$k1=G6-((R1+R3)/2);$$

$$k3=G9-((R5+R3)/2);$$

$$k2=G7-((R2+R3)/2); \text{ and}$$

$$k4=G8-((R4+R3)/2).$$

3. The mathematical calculation method as claimed in claim 2, wherein the four differences (k1~k4) are obtained by shifting four formulas ((R1+R3), (R5+R3), (R2+R3) and (R4+/R3)) one bit to the right individually in digital processing.

4. The mathematical calculation method as claimed in claim 1, wherein the equations corresponding to the four weighing values (k5~k8) include:

$$k5=1/(1+|k1|);$$

$$k6=1/(1+|k2|);$$

$$k7=1/(1+|k3|); \text{ and}$$

$$k8=1/(1+|k4|).$$

5. The mathematical calculation method as claimed in claim 1, further including the steps:

resorting the four weighing values (k5~k8) in the step for calculating the four weighing values (k5~k8), and equations corresponding to the four weighing values (k5~k8) including:

$$k5=|k1|;$$

$$k6=|k2|;$$

k7=|k3|;

k8=|k4|; and ranking the four weighing values (k5~k8), so as to enable k5≦k6≦k7≦k8.

6. The mathematical calculation method as claimed in claim 5, further including steps:
rearranging the proportion of the four weighing values (k5~k8) to obtain the green value G3' after the step of resorting the four weighing values (k5~k8), and equations corresponding to the four weighing values (k5~k8) including:

$k99=k5+k6+k7+k8;$ $k98=k99/2;$ $k97=k99/4;$ $k96=k99/8;$ if k8>(k99−k96), then $k95=(k1*(2^5-2^2))+(k2*2)+k3+k4;$ else if k8>(k99−k97), then $k95=(k1*(2^5-2^3))+(k2*2^2)+(k3*2)+(k4*2);$ else if k8>(k99−k97−k96), then $k95=(k1*(2^5-2^3-22))+(k2*23)+(k3*2)+(k4*2);$ else if k8>(k99−k98), then $k95=(k1*2^4)+(k2*2^3)+(k3*2^2)+(k4*2^2);$ else if k8>(k98−k96), then $k95=(k1*(2^4-2^2))+(k2*(2^4-2^2))+(k3*2^2)+(k4*2^2);$ or else $k95=(k1*2^3)+(k2*2^3)+(k3*2^3)+(k4*2^3),$ $G3'=R3+(k95/2^5).$ 7. The mathematical calculation method as claimed in claim 6, wherein multiplying by 2 means a one-bit shift to the left in digital processing, so that multiplying by $2^2$ means a two-bit shift to the left, multiplying by $2^3$ means a three-bit shift to the left, multiplying by $2^4$ means a four-bit shift to the left, multiplying by $2^5$ means a five-bit shift to the left, and dividing by $2^5$ means a five-bit shift to the right.

8. The mathematical calculation method as claimed in claim 1, further including the steps:
figuring out the proportions of the four weighing values (k5~k8) to a total weighting value (k9) individually in the step of calculating the four weighing values (k5~k8), and equations corresponding to the four weighing values (k5~k8) including:

$k9=k5+k6+k7+k8;$ $k5=k5/k9;$ $k6=k6/k9;$ $k7=k7/k9;$ and $k8=k8/k9.$

9. The mathematical calculation method as claimed in claim 1, wherein an equation corresponding to the green value G3' of the red pixel includes:

$G3'=R3+(k5*k1)+(k6*k2)+(k7*k3)+(k8*k4).$

10. The mathematical calculation method as claimed in claim 1, wherein equations corresponding to the four differences (k1~k14) include:

$k11=G18'-B18;$ $k12=G19'-B19;$ $k13=G20'-B20;$ and $k14=G21'-B21.$

11. The mathematical calculation method as claimed in claim 1, wherein an equation corresponding to the blue value B3' of the red pixel includes:

$B3'=G3'-((k11+k12+k13+k14)/2^2).$

12. The mathematical calculation method as claimed in claim 11, wherein dividing by $2^2$ means a two-bit shift to the right in the B3' equation.

13. The mathematical calculation method as claimed in claim 1, wherein equations corresponding to the red value R6' and the blue value B6' of the green pixel G6 include:

$k15=G1'-R1;$ $k16=G3'-R3;$ $k17=G18'-B18;$ $k18=G19'-B19;$ $R6'=G6-((k15+k16)/2);$ and $B6'=G6-((k17+k18)/2).$ 14. The mathematical calculation method as claimed in claim 13, wherein dividing by 2 means a two-bit shift to the right in the R6' and B6' equations.

15. The mathematical calculation method as claimed in claim 1, wherein the blue value B3' equals an upper limit value in the step of obtaining the blue value B3' of the red pixel R3, if the blue value B3' is more than the upper limit value; and the blue value B3' equals a lower limit value if the blue value B3' is less than the lower limit value.

16. The mathematical calculation method as claimed in claim 15, wherein the upper limit value is 255, the lower limit value is 0.

17. The mathematical calculation method as claimed in claim 1, wherein the red value R6' or the blue value B6' equals an upper limit value in the step of obtaining the red value R6' and blue value B6' of the green pixel G6, if the red value R6' or the blue value B6' is more than the upper limit value; and the red value R6' or the blue value B6' equals a lower limit value if the red value R6' or the blue value B6' is less than the lower limit value.

18. The mathematical calculation method as claimed in claim 17, wherein the upper limit value is 255 and the lower limit value is 0.

* * * * *